United States Patent [19]

Gregoire

[11] Patent Number: 5,002,215
[45] Date of Patent: Mar. 26, 1991

[54] PORTABLE SHOPPING CART COUPON FILE AND METHOD OF UTILIZING SAME FOR SHOPPING

[76] Inventor: Joseph R. Gregoire, 1603 Moran, Lincoln Park, Mich. 48146

[21] Appl. No.: 490,880

[22] Filed: Mar. 9, 1990

[51] Int. Cl.⁵ .................................................. B60R 7/00
[52] U.S. Cl. ..................................... 224/277; 224/273; 220/94 R; 220/94 A; 280/33.992; 206/425
[58] Field of Search ................ 206/44 B, 38, 39, 425, 206/831; 224/273, 277; 220/94 R, 94 A, 318; 280/33.992

[56] References Cited

U.S. PATENT DOCUMENTS

| | | | |
|---|---|---|---|
| 1,217,243 | 2/1917 | Tucker et al. | 206/425 |
| 1,402,439 | 1/1922 | Paulson | 206/425 |
| 2,232,939 | 2/1941 | Cohen | 206/39 |
| 2,341,308 | 2/1944 | Berry | 220/94 R |
| 2,713,368 | 7/1955 | Thomas | 206/39 |
| 3,351,380 | 11/1967 | Sprague | 224/273 |
| 3,595,433 | 7/1971 | Jones | 206/44 B |
| 3,741,433 | 6/1973 | Bentley | 220/318 |
| 3,744,623 | 7/1973 | Woofter | 224/277 |
| 3,874,501 | 4/1975 | Cronheim | 206/425 |
| 4,034,539 | 7/1977 | Economy | 280/33.992 |
| 4,453,788 | 6/1984 | Russell | 224/273 |
| 4,643,280 | 2/1987 | Hensley | 224/273 |
| 4,662,518 | 5/1987 | Chiappetta et al. | 206/39 |
| 4,691,840 | 9/1987 | Ferbrache | 220/318 |
| 4,702,402 | 10/1987 | Ferri | 224/273 |
| 4,735,313 | 4/1988 | Schoenberg | 220/94 A |
| 4,793,508 | 12/1988 | Thompson | 206/425 |
| 4,819,827 | 4/1989 | DiSesa | 220/318 |

Primary Examiner—David T. Fidei
Attorney, Agent, or Firm—Dykema Gossett

[57] ABSTRACT

A portable shopping cart coupon file is used with a shopping cart that has a push handle and a back support for a baby seat. The back support is pivotably connected to the shopping cart. The portable shopping cart coupon file has a generally planar base plate. A rectangular box is disposed on the top side of the base plate. The box has a cover. A restraining device extends from the bottom side of the base plate which is associated with the top boundary of the back support of the shopping cart to restrain the base plate from sliding relative to the cart. A method of shopping with the portable shopping cart coupon file involves collecting coupons and filing said coupons in the portable shopping cart coupon file, transporting the portable shopping cart coupon file to a location at which shopping is to take place by gripping the handle of the portable shopping cart coupon file, selecting a shopping cart at the place of shopping, swinging the back support of the shopping cart into its disposition as a back support for the baby seat, placing the base plate so that the restraining means is associated with the top boundary of the back support of the shopping cart to restrain the base plate from sliding relative thereto and associating the front end portion of the base plate the push handle of the shopping cart, and removing the cover to select coupons filed in the portable shopping cart coupon file as needed.

8 Claims, 2 Drawing Sheets

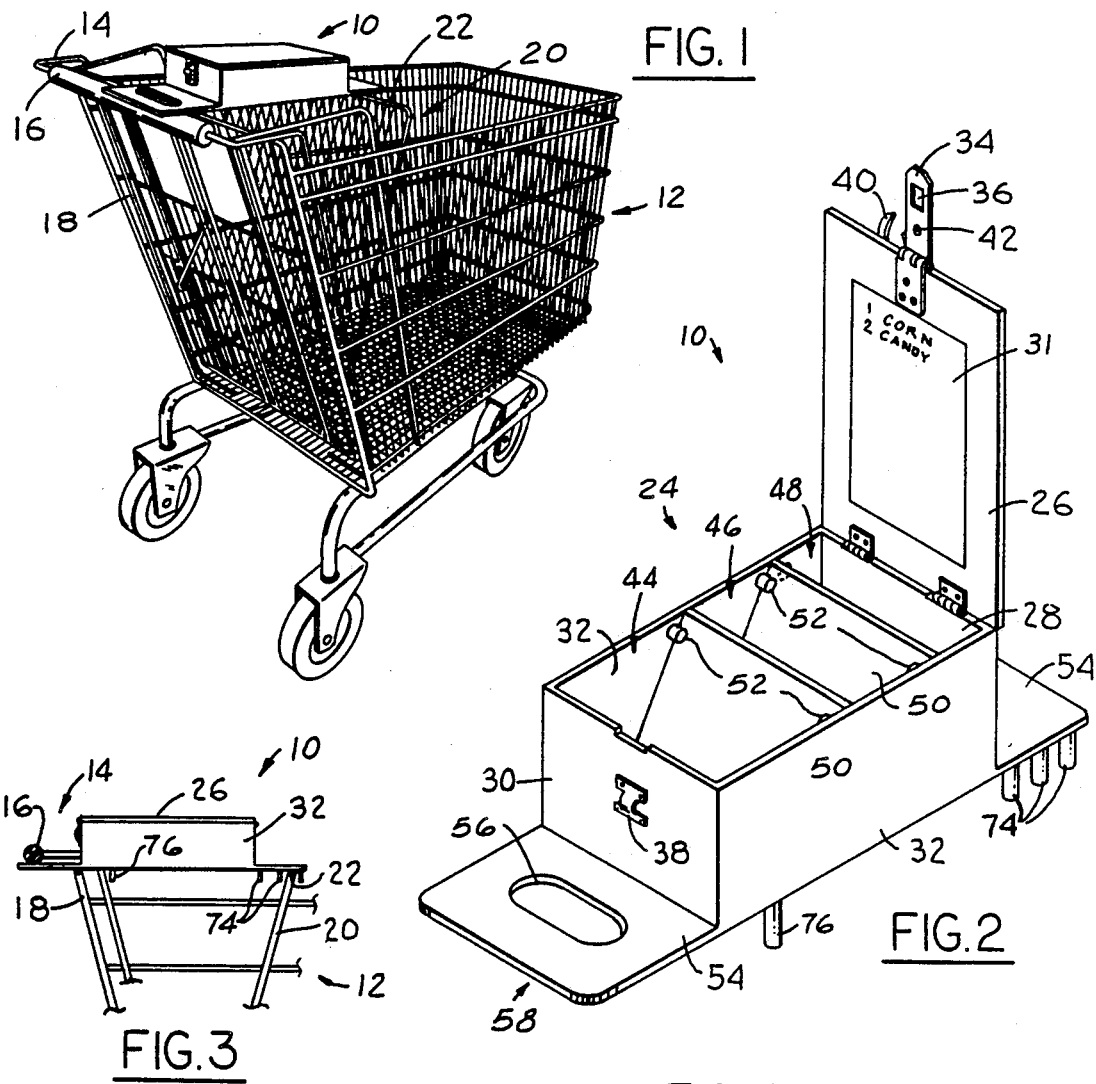
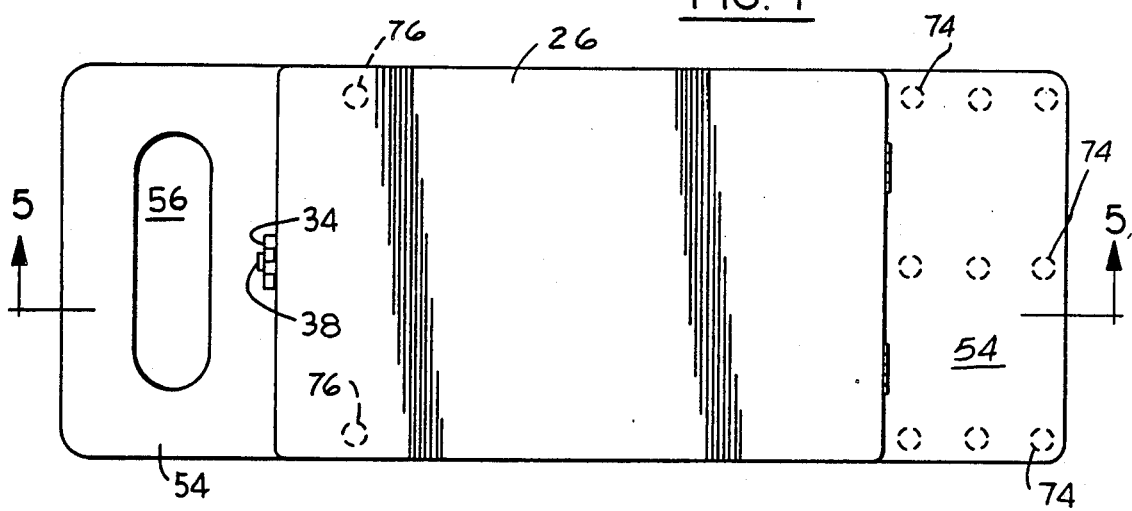

PORTABLE SHOPPING CART COUPON FILE AND METHOD OF UTILIZING SAME FOR SHOPPING

FIELD OF THE INVENTION

The present invention relates to a compartmentalized box for storing and organizing coupons and for transporting coupons to and from places at which the coupons are used to purchase items at reduced prices. More particularly, the invention relates to a compartmentalized box or file for storing and organizing coupons and for taking the coupons on shopping trips where the coupons may be accessed as needed when shopping. Still more particularly, the present invention relates to a coupon file with which a consumer may store, organize, transport, and readily and conveniently access coupons during shopping while the consumer uses a standard shopping or grocery cart.

The invention also relates to a method for shopping with coupons by which the portable shopping cart coupon file is used.

BACKGROUND OF THE INVENTION

In this consumer-oriented society, printed cash discount coupons serve as an advertising vehicle for sales of products in department stores, particularly grocery stores. As an incentive to consumers to purchase certain products, coupons discount purchase prices for these products. Thus, the coupons provide significant cost savings for consumers. A substantial many consumers take advantage of these cost savings by collecting and using coupons—so much so that there is a particular class of consumers who consider that there is an art to shopping with coupons.

Consumers find such coupons in mass distribution media, such as news papers and magazines. Consumers also receive coupons mass mailed to them in envelopes. In most situations, consumers do not coincidentally come upon the coupons for items on their shopping lists just as they are about to go shopping. More often a consumer comes across coupons while reading magazines, newspapers, or his or her mail and then sets the coupons aside until shopping is scheduled and selected coupons for particular items will provide shopping needs.

When using the coupons, the consumer must carry and access the coupons while shopping. This can be a particularly clumsy operation when a shopping cart must be pushed, at times with two hands. The coupons may not be conveniently laid in the cart as small pieces of paper are prone to slip through the wire sides and floor of the cart. The logistics are not substantially lessened by a planned shopping list and order of procurement to match coupons with goods; such usually matching calls for time consuming planning and does not accommodate the spontaneity that usually takes place during shopping when a substitute good may be needed or an item is suddenly discovered missing from the shopping list. Even when item and coupon are matched in the grocery store aisle, they must be matched again at the check-out counter, and when this is done, even by a cashier, it causes more time consuming delay.

RELATED ART

I know of several devices that may be used, first, to store coupons until they are to be taken on a shopping trip and, second, to help match the coupons with products while shopping.

U.S. Pat. No. 4,591,054 issued to Blossom discloses a combination purse-coupon organizer device with methods of constructing and using it. The device is not particularly adapted to use with a shopping cart and is distinguished from the present invention on its lack of structure for installation onto a shopping cart, which will be seen to be one advantage of the present invention.

U.S. Pat. No. 4,572,547 issued to Phillips discloses a multi-function tickler filing system. But, again, there is no teaching of adaptation to a shopping cart.

U.S. Pat. No. 4,397,417 issued to Carlson discloses a folder for coupons that is of interest because of its dedication to coupons. But this device has only its dedication in common with the present invention; it lacks any structure anticipating the significant advantage of the present invention.

U.S. Pat. No. 4,375,263 issued to Dworkin discloses a compartmentalized file box. But it lacks that important aspect of the present invention, that is, Dworkin teaches nothing of adapting the file box to installation on a shopping cart.

U.S. Pat. No. 4,097,067 issued to Schechter discloses a folder for printed coupons. Like the disclosures of Blossom and Carlson, this device is of interest only because of its dedication to the coupon art.

I have seen advertisements for coupon file boxes. I have even seen an advertisement for a file box dimensioned to sit on the baby seat of a standard grocery shopping cart. But pictures of these devices do not distinguish their structure from that of an ordinary file box and the pictures show no structure that anticipates the present invention or suggests any combination that would teach the invention.

EXPERIMENTATION

Over a period of years since aspects of the invention were first conceived, I have worked at reducing to practice the invention that I will disclose herein. Much effort had initially been made in deciding on the number of categories of coupons that I would need. Thus initially I was concerned about determining the size of the box enclosure of the invention, as the capacity of the box enclosure would be determined by the number of coupons I thought would be needed. As I experimented with use of the invention in different shopping situations, I discovered that, although the structural components of shopping carts in different stores were somewhat the same, the dimensions of the carts were not uniform. Thus I became concerned with how the base plate of the invention would be made to be installed onto a variety of shopping carts of different sizes. Over the period of years of reducing the concept to practice, I experimented with using the invention on shopping carts in various stores, while also developing other aspects of the invention. I took down the dimensions of different shopping carts and worked at developing the base plate to fit into an optimum position for all carts. Finally, in December, 1989, I was satisfied that the invention was adapted to fit all "standard" shopping carts and to fit 80% of the shopping carts in a locked position whereby the base plate fits under the shopping cart's handle.

OBJECTS OF THE INVENTION

Accordingly, it is the primary object of the present invention to provide a portable shopping cart coupon file for storing and organizing coupons and for transporting coupons to and from places where the coupons are used in purchasing items.

It is another object of the invention to provide a portable shopping cart coupon file for conveniently taking on shopping trips so that the coupons may be accessed as needed.

It is yet another object of the invention to provide a portable shopping cart coupon file for storing, organizing, transporting, and readily and conveniently accessing coupons during shopping, especially while using a standard shopping cart.

A related object of the present invention is to provide a method for shopping with coupons which involves using a shopping cart and the portable coupon file of the invention.

SUMMARY OF THE INVENTION

According to the present invention, a portable shopping cart coupon file may be conveniently installed in position on a standard model cart of the kind that is found in supermarkets and thrift stores. The shopping cart includes a push handle, usually with a handle grip, extending outwardly from the back wire wall of the shopping cart and a wire back support that pivots from a position where it is parallel to and rests generally against the back wire wall to a position where it angles outwardly from the back wire wall. When angled outwardly the wire back support is an integral part of the shopping cart's baby seat. When installed on the shopping cart, the portable shopping cart coupon file rests on the push handle or the front wall of the shopping cart and rests on the wire back support.

The portable shopping cart coupon file may be constructed of a plastic material by injection molding. The portable shopping cart coupon file has a hinged cover with a latch to secure the cover shut over a plurality of compartments formed by the sides of the box structure and a plurality of planar divider support members.

As an integral structure of the portable shopping cart coupon file, a base plate extends outwardly from the box structure. According to one embodiment of the invention, an opening in the base plate is disposed in the base plate outwardly from the box structure. This opening provides a means for gripping the base plate as a handle for carrying the portable shopping cart coupon file. According to another embodiment, there is provided a latching and handle device that pivots to present a carrying handle while latching the cover closed for carrying the portable shopping cart coupon file. According to either embodiment, extending from the underside of the base plate are a series of rows of pegs. The plurality of rows of pegs provide for adjusting the base plate to fit shopping carts of different sizes. Two pegs are used to complete a stand for stabilizing the portable shopping cart coupon file when it rests on a table or the like. The base plate may be "locked" in place under push handle of a shopping cart to provide extra securement against accidentally knocking the portable shopping cart coupon file off the shopping cart during shopping.

A method of shopping with the portable shopping cart coupon file involves placing the portable shopping cart coupon file on a table or the like while the coupons are being collected; transporting the portable shopping cart coupon file to a location at which shopping is to take place by gripping the base plate by the base plate handle or gripping the latching and handle device, according to the embodiment of the portable shopping cart coupon file; selecting a shopping cart at the location at which shopping is to take place; swinging the wire back support of the shopping cart into its angle position as a back support for the baby seat; placing the base plate so that two rows of the pegs straddle the wire back support and the base plate rests on the wire back support and on either the wire back wall of the cart, below the push handle, or on the push handle; unlatching the cover and opening the box structure; and referring to coupons by their categories as needed.

BRIEF DESCRIPTION OF THE DRAWINGS

The objects and features of the present invention will become apparent with a detailed account of the invention and reference to the accompanying drawings in which:

FIG. 1 is a perspective view of a shopping cart with the present invention installed thereon.

FIG. 2 is a perspective view of the portable shopping cart coupon file that is the present invention.

FIG. 3 is a side elevation of the portable shopping cart coupon file that is the present invention, a different installation than as shown in FIG. 1.

FIG. 4 is a top elevation of the portable shopping cart coupon file that is the present invention shown in FIG. 2.

DETAILED DESCRIPTION OF THE PREFERRED EMBODIMENT

Figure 5:
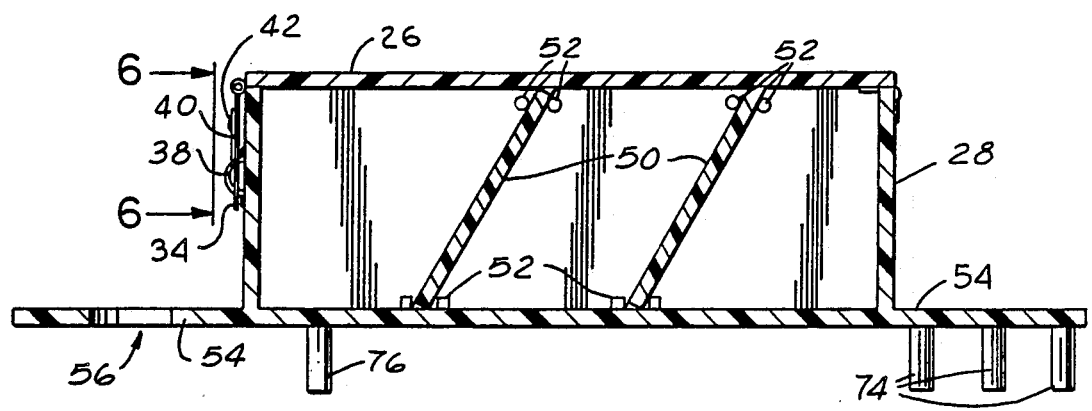
FIG. 5 is a cross-section of the portable shopping cart coupon file as viewed in the direction of arrows 5—5 of FIG. 4.

With reference to FIG. 1, the portable shopping cart coupon file shown generally at 10 is shown installed in position on a shopping cart 12. Shopping cart 12 is a standard model cart, in that it has the structural sameness of most shopping carts found in supermarkets and thrift stores. This sameness includes a push handle 14 with a handle grip 16. Push handle 14 extends outwardly from the back wire wall 18 of shopping cart 12. Also included is a wire back support 20 that pivots from a position where it is parallel to and rests generally against back wire wall 18, to a position where it angles outwardly from back wire wall 18 to where its wire top boundary 22 is out and away from back wire wall 18. Wire back support 20 when angled outwardly is a back support of a baby seat that is integral with shopping cart 12. When portable shopping cart coupon file 10 is installed on shopping cart 12, the front of portable shopping cart coupon file 10 faces the back of shopping cart 12.

With reference to FIG. 2, the portable shopping cart coupon file 10 may be constructed of a plastic material, preferably a thermoplastic, by injection molding techniques known by those skilled in the art. Portable shopping cart coupon file 10 has a box structure 24 in which coupons, checkbooks, shopping lists, and other such items may be held. Box structure 24 includes a cover 26 which may be hinged to a back member 28 or it may be hinged integrally with a natural or "living" hinge formed between cover 26 in a manner known to those skilled in the art. With the cover 26 hinged to back member 28, the front of cover 26 may be moved away from or toward a front member 30 to open or close box structure 24 as cover 26 pivots. The underside of cover 26—which is revealed when the box structure is open has indicia 31 listing categories of coupons. The top side may be used as a writing desk or may be adapted to carry a shopping list. Box structure 24 has a pair of substantially parallel side members 32.

Figure 6:
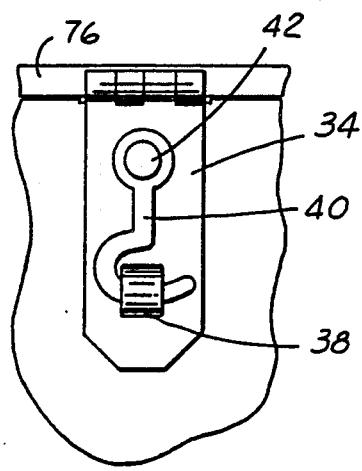
FIG. 6 is a detail of one embodiment of the latch mechanism for the compartmentalized coupon storage box and handle rest, as viewed in the direction of arrows 6—6 of FIG. 5.

Cover 26 carries a pivotal latch member 34. Latch member 34 has an opening or slot 36. Front member 30 carries a protruding latching member 38 which engages and is received by slot 36 to latch cover 26 to front member 30 and to hold box structure 24 securely closed when portable shopping cart coupon file 10 is transported. It is to be appreciated that latch member 34 may be hinged to cover 26 by a conventional hinge or by a "living" hinge much in the manner of how cover 26 is hinged to back member 28. Moreover, those skilled in the art will appreciate that the latching mechanism may be by many means known, including the latching mechanism shown in FIG. 6, in which a hook 40 rotates about a pin 42 so that it may be swung into position behind protruding latching member 34 to hold latch member 34 fixedly in the latched position shown in FIG. 6.

Portable shopping cart coupon file 10 has a plurality of compartments 44, 46, and 48 shown for illustration purposes as three, but more or less compartments 44, 46, and 48 may be provided. The compartments 44, 46, and 48 are formed by back and front members 28 and 30, and by a plurality of planar divider support members 50, shown in cross-section in FIG. 5. These members 50 are preferably formed independently from the integrally joined members of portable shopping cart coupon file 10, for example back member 28, front member 30, and side members 32, and—where the option of a living hinge construction is used—cover 26. Thus, independently formed divider support members 50 may be slid into place by use of support means known to those of ordinary skill in the art so that divider support members 50 are angled away from being parallel to front member 30 in the manner illustrated in FIG. 2. In the preferred embodiment, to accommodate injection molding of box structure box structure 24, these support means are posts 52.

Also included preferably as integral structure of portable shopping cart coupon file 10 is a base plate 54 which extends outwardly from front member 30. In the embodiment shown in all of the Figures, the base plate 54 extends outwardly from both front member 30 and back member 28, but it should be understood that the extension of base plate 54 from back member 28 is not a limitation of the invention. The extension outwardly from front member 30 is significant in that it accommodates an opening 56 in base plate 54. Opening 56 converts base plate 54 into a handle 58 by providing a means for gripping base plate 54.

Figure 7:
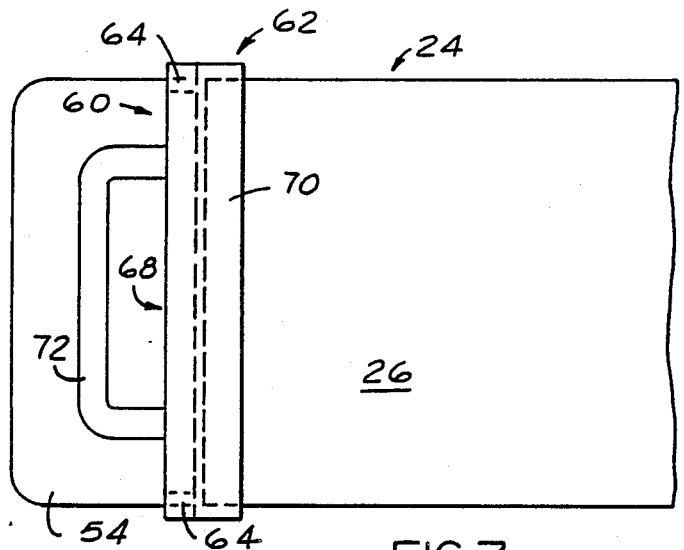
FIG. 7 is a top elevational detail of another embodiment of the latch mechanism for the portable shopping cart coupon file with the latch mechanism latched.
Figure 9:
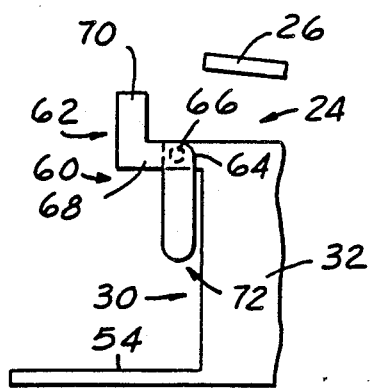
FIG. 9 is the side elevational detail of the embodiment of the latch mechanism shown in FIG. 7 with the latch mechanism unlatched.
Figure 8:
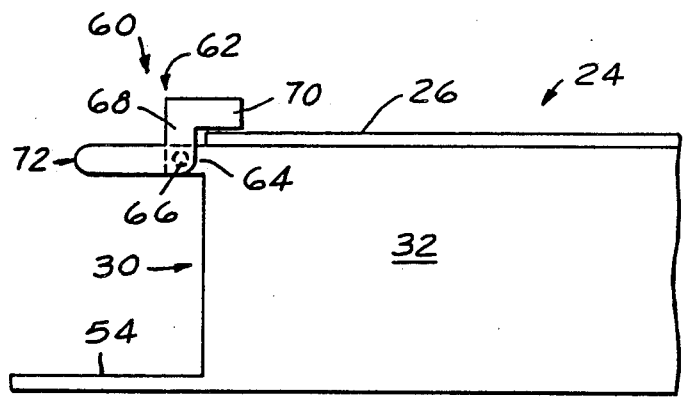
FIG. 8 is a side elevational detail of the embodiment of the latch mechanism shown in FIG. 7 with the latch mechanism latched.

In another embodiment of the invention, another latching and handle device 60 is used as is shown in FIGS. 7, 8 and 9. Latching and handle device 60 has an angle latch 62 pivotally connected to box structure 24. To provide for this connection, two flanges 64 project from front member 30. Angle latch 62 is pivotally attached to front member 30 by pins 66. Angle latch 62 has a front leg 68 and a top leg 70. A U-shaped handle 72 projects from front leg 68 generally in a plane that is generally parallel to top leg 70. When U-shaped handle 72 projects in a plane that is generally parallel to base plate 54, top leg 70 extends over cover 26. When U-shaped handle 72 is pivoted downwardly toward base plate 54, cover 26 is free to be pivoted to an open position away from front member 30.

Base plate 54 has a top side, on which box structure 24 is disposed. Base plate 54 also has a bottom side, from which a plurality of pegs 74 and 76 extend. A multiplicity of rows of pegs 74—in the examples, three rows of pegs 74—extend across base plate 54 parallel to front member 30 and back member 28. Pegs 74 are also arranged in a multiplicity of columns—in the examples, three columns of pegs 74 extend along base plate 54 parallel to side members 32. Preferable three pegs 74 are equispaced in each row with one peg 74 generally disposed in the middle of base plate 54 and with the remaining two pegs 74 disposed adjacent a respective edge of base plate 54 as shown in FIG. 4.

As can be seen in FIG. 3, when portable shopping cart coupon file 10 is used, the pegs 74 of two adjacent rows straddle top boundary 22 of wire back support 20 of the baby seat of shopping cart 12. Thus the two rows of adjacent pegs 74 provide restraining means to restrain base plate 54 and thereby portable shopping cart coupon file 10 from sliding forward or backward across top boundary 22 when portable shopping cart coupon file 10 is installed on shopping cart 12 (the side members 30 or rails of the shopping cart 12 prevent the portable shopping cart coupon file 10 from sliding off the laterally of shopping cart 12). The plurality of rows of pegs 74 provide for adjustment of base plate 54 with pegs 74 to fit shopping carts 12 of different sizes. In FIG. 1, base plate 54 is shown resting on handle grip 16, but as shown in FIG. 3 base plate 54 may be "locked" in place under push handle 14 to provide extra stability. By either resting on the handle grip 16 or push handle 14 or by being "locked" in place under the push handle 14, the front end portion of the base plate 54 is said to be "associated" with the push handle 14.

Two other pegs 76 are provided as stands or legs with pegs 74 to seat portable shopping cart coupon file 10 stable and horizontal on a table or shelf.

Use of the portable shopping cart coupon file 10 is disclosed with a particular method of shopping with the portable shopping cart coupon file 10. The method involves a first step of placing the portable shopping cart coupon file 10 on a table or the like while coupons are being collected. The coupons are filed according to a list 31 of categories on the underside of the cover 26. The categories that I have found convenient are: (1) ABOUT TO EXPIRE COUPONS; (2) BAKING SUPPLIES; (3) BAKE MIXES; (3) CANDY; (4) CEREAL; (5) CLEANERS (BATH); (6) CLEANERS (GENERAL); (7) CLEANERS (KITCHEN); (8) CLEANERS (LAUNDRY); (9) CONDIMENTS; (10) COOKIES; (11) CRACKERS; (12) DAIRY; (13) DE- ODORANTS; (14) DESSERTS; (15) DINNERS AND POT PIES; (16) DRESSINGS; (17) DRINKS (COFFEE AND TEA); (18) DRINKS (MIXES); (19) DRINKS (PREPARED - POP, ETC.); (20) FEMININE HYGIENE; (21) FISH; (22) FOREIGN FOODS; (22A) FROZEN FOODS; (23) HAIR CARE; (24) HAND SOAP; (25) ICE CREAM; (26) JUICES (ORANGE, ETC.), ETC.; (27) LUNCH SNACKS; (28) MEAT; (29) MEDICINE; (29A) MICROWAVE; (30) MISCELLANEOUS (FOODS); (31) MISCELLANEOUS (OTHER); (32) ORAL HYGIENE; (33) PANTYHOSE; (34) PAPER; (35) PET SUPPLIES; (36) PLASTIC; (37) POULTRY; (38) SAUCES AND SYRUPS; (39) SNACKS; (40) SOUPS; (41) SPICES; (42) TOILETRIES; (43) VEGETABLES.

A second step involves transporting the portable shopping cart coupon file 10 to a location, for example a grocery store, at which shopping is to take place. As a third step, portable shopping cart coupon file 10 is transported by gripping the base plate by the handle 58 or by latching and handle device 60, according to the embodiment of the portable shopping cart coupon file 10. A fourth step involves selecting a shopping cart 12 at the location for shopping. As a fifth step, wire back support 20 is swung into its angle position as a back support for the baby seat. A sixth step involves installing portable shopping cart coupon file 10 onto shopping cart 12 by placing the base plate 54 so that two rows of pegs 74 straddle the wire back support and the base plate 54 rests on the back wire wall 18 of the shopping cart 12 and below the push handle 14 or on it. As a seventh step, cover 26 is then unlatched, opening the box structure 24. The consumer thereafter may refer to coupons by their categories as needed.

I claim:

1. A portable shopping cart coupon file for use with a shopping cart having a push handle grip disposed outwardly from a back wall of said shopping cart and extending generally parallel to said back wall and a back support being pivotably connected to the shopping cart with the top boundary of the back support movable to and from the back wall, the portable shopping cart coupon file comprising:
   a generally planar base plate having a top side and a bottom side, the base plate extending between front and back end portions;
   a rectangular box disposed on said top side of the base plate, said rectangular box having front, back, and a pair of side members, the base plate extending generally perpendicular to and outwardly from said front member for associating with said push handle grip of said shopping cart;
   cover means for closing the rectangular box; and
   restraining means extending from said bottom side of said base plate, for associating with the top boundary of the back support of the shopping cart to restrain the base plate from sliding relative thereto when the front end portion of the base plate is associated with the push handle of the shopping cart by extending generally past said push handle grip.

2. The portable shopping cart coupon file of claim 1 wherein the front, back, and a pair of side members are disposed between said cover means and the base plate, the portable shopping cart coupon file further comprising hinge means attached to the back member and to the back member so as to hinge the cover means to the back member for opening and closing the cover, and means associated with the cover and the front member for securing the cover closed.

3. The portable shopping cart coupon file of claim 1 wherein an opening is in said front end portion of the base plate, said opening providing means for gripping the base plate as a handle for carrying the portable shopping cart coupon file.

4. The portable shopping cart coupon file of claim 1 further comprising hinge means attached to the back member and to the back member so as to hinge the cover means to the back member for opening and closing the cover, and a latching and handle device, the latching and handle device including an angle latch pivotally connected to the rectangular box, the angle latch having a front leg and a top leg disposed perpendicularly to said front leg, and a U-shaped handle fixedly connected to and projecting from said front leg generally in a plane that is generally parallel to said top leg, said top leg extending over said cover means to secure said cover means closed when the U-shaped handle projects in a plane that is generally parallel to the base plate and leaving said cover means openable when the U-shaped handle is pivoted downwardly toward the base plate.

5. The portable shopping cart coupon file of claim 1 wherein said restraining means is a plurality of rows of pegs, each said row extending across the base plate parallel to the back member, the pegs of two adjacent rows restraining the base plate when straddling said top boundary of the back support of the shopping cart.

6. A portable shopping cart coupon file for use with a shopping cart having a push handle extending generally perpendicular to and backwardly from a back wall of the shopping cart and a back support for a baby seat, the back support pivotably connected to the shopping cart with the top boundary of the back support movable to and from the back wall, the portable shopping cart coupon file comprising:
   a generally planar base plate having a top side and a bottom side, the base plate extending between first and second end portions;
   a rectangular box disposed on said top side of the base plate, said rectangular box having front, back, and a pair of side members, the base plate extending generally perpendicular to and outwardly from said front member;
   cover means for closing the rectangular box; and
   restraining means extending from said bottom side of said base plate, for associating with the top boundary of the back support of the shopping cart to restrain the base plate from sliding relative thereto when the front end portion of the base plate is associated with the push handle of the shopping cart, the base plate being associated with the push handle of the shopping cart by resting on the push handle, said restraining means is a plurality of rows of pegs, each said row extending across the base plate parallel to the back member, the pegs of two adjacent rows restraining the base plate when straddling said top boundary of the back support of the shopping cart.

7. The portable shopping cart coupon file of claim 5 wherein the base plate is associated with the push handle of the shopping cart by being locked in place under the push handle.

8. A portable shopping cart coupon file for use with a shopping cart having a back wall, a back support for a baby seat, and a push handle extending generally outwardly from said back wall, said push handle including a push handle grip extending generally parallel to the back wall, the back support pivotably connected to the shopping cart with the top boundary of the back support movable to and from the back wall, the portable shopping cart coupon file comprising:
- a rectangular box having a front, back, and bottom members, a pair of side members, and an open top;
- a generally planar base plate having a front end portion for placement generally contiguous with the push handle grip when the portable shopping cart coupon file is used with the shopping cart, the base plate extending generally perpendicular to and outwardly from said front member to said front end portion;
- cover means for closing said open top; and
- restraining means extending from said bottom member, for associating with the top boundary of the back support of the shopping cart to restrain the base plate from sliding relative thereto when the front end portion of the base plate is generally contiguous with the push handle grip of the shopping cart.

* * * * *